Sept. 28, 1965 A. I. PALEY 3,209,176

PIEZOELECTRIC VIBRATION TRANSDUCER

Filed June 16, 1961

INVENTOR.
ALFRED I. PALEY
BY
Raymond A. Paquin
ATTORNEY.

1

3,209,176

PIEZOELECTRIC VIBRATION TRANSDUCER

Alfred I. Paley, Wantagh, N.Y., assignor to American Bosch Arma Corporation, a corporation of New York
Filed June 16, 1961, Ser. No. 117,745
3 Claims. (Cl. 310—8.2)

The present invention relates to piezoelectric and ferroelectric vibration transducers and has particular reference to novel configurations of the active element therein.

The manufacturers of vibration transducers have been plagued by problems relating to the insulating of the ungrounded electrode of a piezoelectric or ferroelectric driving element. When operating in air, an uninsulated undergrounded electrode presents a shock hazard to personnel and is susceptible to deterioration of performance in a high humidity environment. When operating under water as in sonar devices the relatively large surface area of the electrode must be completely insulated. This prevents operation in the efficient "free flooded" state.

In the present invention, the transducer includes an even numbers of layers of piezoelectric or ferroelectric material having similarly polarized faces in contact and which are electrically connected in parallel to the driving generator. In this construction the exposed surfaces are at the same potential, which may be ground potential, while the high potential surface is internal of the transducer. This permits easy fabrication of transducers suitable for high humidity or underwater applications due to the relatively small area (the edge of the high potential surface) which demands insulation.

An additional advantage of this type of layer construction is found in the lower electrical impedance for a transducer of similar size in the single piece earlier construction. The lowered electrical impedance reduces the maximum voltage requirements of the driving generator by a factor equal to the number of layers in the transducer for the same power output, thereby permitting further simplification in the matter of insulation and resulting in a device less likely to possess a dangerous shock hazard.

For a more complete understanding of the invention reference may be had to the accompanying diagrams, in which FIG. 1 shows a prior art transducer in section;

Figure 1:
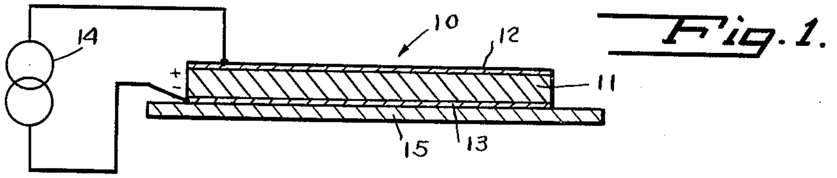

FIGURE 1 shows a vibration transducer 10 having a body 11 of piezoelectric or ferroelectric material such as piezoelectric quartz or titanate and zirconate ceramics for example, loosely termed electrostrictive to indicate that a dimensional strain is produced in response to an electrical field applied across the body, i.e., via electrodes 12, 13 which are plated to the body 11.

Effective polarization of the body 11 is represented by the + and − signs near the electrodes 12, 13 and are used to clarify the principle of the invention. The plus and minus signify that the electrostricitve body 11 experiences a strain in one direction when the electric field

2 across the body agrees with the body 11 polarization and experiences a strain in the opposite direction when the electric field across the body is opposite to the indicated polarization. The term polarization may be interpreted to include the orientation of the axes of piezoelectric material, such as quartz crystals as well as the orientation of the molecular structure of the ferroelectrics.

The strain in the body 11 furthermore may be made to take place in any chosen direction by proper design of the body 11. For example in FIGS. 1 and 2, the body may be assumed to experience thickness expansion while in FIGS. 3, 4 the body undergoes radial expansion, or length expansion.

Returning to FIG. 1, the electrodes 12, 13 are connected to a source of alternating potential represented by generator 14. Electrode 13 is attached to a surface 15 which is to be driven by the transducer 10 and which in practical construction is grounded. The other electrode 12 is therefore at a high potential with respect to the grounded surface 15 and imposes certain problems of insulation. In particular, in an underwater environment such as encountered by a sonar transducer insulation of the large area of electrode 12 to allow the transducer to be free flooded becomes extremely difficult.

Figure 2:
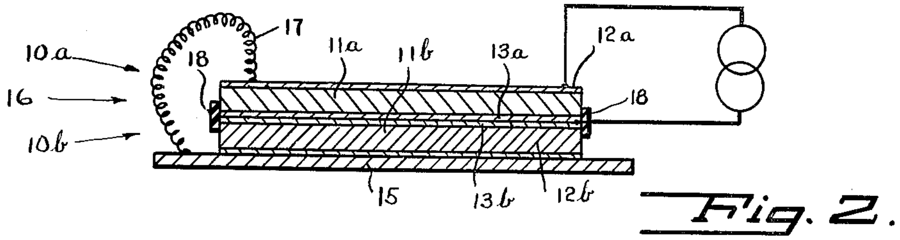
FIG. 2 shows a transducer according to the present invention in section.

The new configuration of this invention, in the form of a sandwich shown in FIG. 2, alleviates this condition. The transducer 16 in this case includes a pair of transducers 10*a* and 10*b* such as those in FIG. 1 in which similarly polarized electrodes 13*a* and 13*b* are in physical contact while electrode 12*b* is attached to the surface 15 and electrode 12*a* is exposed. The transducers 10*a* and 10*b* would be substantially one half the thickness of transducers 10 in FIG. 1 for the same resonant frequency.

One side of generator 14 is electrically connected to the electrodes 13*a* and 13*b*, the other side of the generator is connected to both electrodes 12*a* and 12*b*. Both transducers 10*a* and 10*b* will therefore act together, i.e., both will expand together and both will contract at the same time, since the polarity of the exciting field from generator 14 produces the same effect on both transducers at the same time. It will be seen that the transducer 16 acts mechanically exactly in the same way as transducer 10 of FIG. 1 but the electrical connections of FIG. 2 have several important differences. Here the upper exposed surface 12*a* is electrically held at the same potential as the lower electrode 12*b* by the electrical connection 17. The high potential surfaces 13*a* and 13*b* are imbedded in the structure and it is relatively simple to insulate the circumference of these electrodes by providing an insulating layer 18 around the center of transducer 16. The insulation 18 is on a surface where vibrational activity is at a minium, or nodal plane, and therefore the insulation will not damp the vibrational activity of the transducer.

Another advantage is realized in the difference in electrical impedance of the device of FIG. 2. In comparison with a single crystal expander of the same overall dimensions as in the sandwich, the clamped capacitance $Ce$ of the sandwich is four times greater than that of the one piece device. Since the capacitance $Ce$ of the crystal is a function of area divided by thickness, each piece of the sandwich (11*a* and 11*b*) being half the thickness of the original 11, and having the same surface area, has twice the capacitance. The two pieces of the sandwich are connected in parallel and therefore the total capacity is four times greater than that of the original. This by itself is not a big advantage. However, the impedance of the device can be shown to follow the impedance of Ce. That is, the acoustic impedance of the device remains the same, if the dimension remains the same. The conversion of the acoustic impedance to electrical impedance involves the concept of an equivalent circuit with an equivalent transformer with turns ratio of $1:\phi$. The electrical impedance is the acoustic impedance divided by $\phi^2$. For a transducer using piezoelectric ceramics, $\phi = Ce\tau$ where $\tau$ is the coupling coefficient relating voltage to displacement. Ce as shown above is four times greater. In order to obtain the same displacement in the sandwiched case as in the single piece, each half need only be displaced by one half the original amount which requires only half the voltage. $\tau$ therefore is half the value it was before. The product $Ce\tau$ or $\phi$ therefore is twice the value it was before and the electrical impedance which is divided by $\phi^2$ is therefore ¼ what it is for the single crystal transducer. This means that for the same power level ½ the voltage is required. It should be noted that the dielectric stress which is voltage applied/thickness remains the same.

Figure 3:
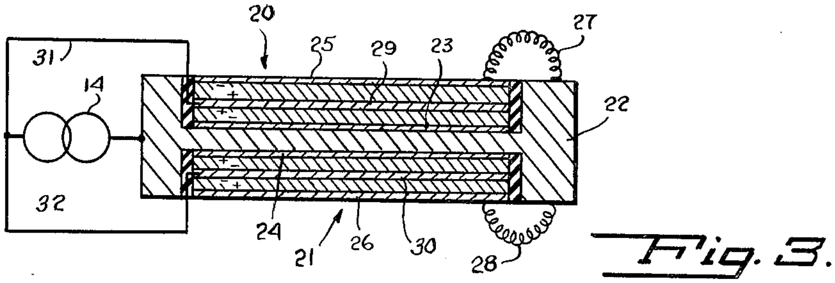
FIG. 3 shows one application of the transducer shown in FIG. 3.

The principles of the invention may be applied to all types of vibration transducers. FIG. 3 shows the new concept applied to the transducer described in a copending application S.N. 36,434, now Patent No. 3,123,727, filed June 15, 1960, and assigned to the assignee of this invention. A pair of transducers 20 and 21 are mechanically and electrically bonded to opposite sides of a light metallic body 22 through their respective exterior electrodes 23, 24. The polarization of the upper transducer 20 (−++−) is opposite to that of the lower transducer 21 (+−−+). The exterior electrodes 25 and 26 respectively are electrically connected to the metallic body 22 by the wires 27, 28. Thus, all of the exterior electrode of the transducers 20, 21 are all at the potential of the body 22 which is connected to one side of the generator 14. The other side of the generator 14 is connected to the intermediate electrodes 29 and 30 via leads 31 and 32. Both intermediate electrodes 29 and 30 correspond to the contacting electrodes 13*a*, 13*b* of FIG. 2 which are integrated into a single electrode for simplicity.

The cross section of FIG. 3 can represent a flexure mode vibrating plate of either rectangular or circular shape. In the case of a rectangular plate, the transducers are strained along parallel axes in opposite directions while in the case of a circular plate the transducers are either radial type expanders or longitudinal type expanders in which the expansion takes place along axes perpendicular to each other. In either case, the area of one side of the plate is increased while the area of the opposite side of the plate is decreased so that the plate flexes about a nodal locus.

The configuration of FIG. 3 gives the required opposing reactions on the opposite sides of the plate even though the entire upper and lower surfaces of the composite structure are at the same potential. The only electrical insulation required is that between the edges of the transducer and the recesses by which they are surrounded, i.e., insulating material 33.

Figure 4:
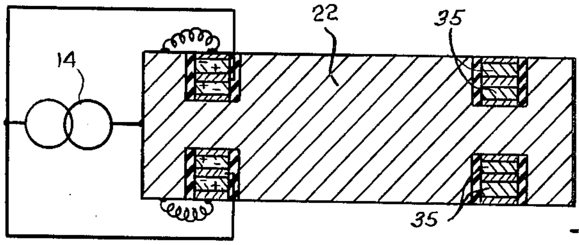
FIG. 4 is a modification of FIG. 3.

FIG. 4 shows an adaptation of FIG. 3 in which the active electrostrictive material 35 is concentrated at the nodal locus, and is an improvement on the subject matter of a copending patent application S.N. 115,988 filed June 9, 1961 and assigned to the assignee of this invention. The active material is a length expander or radial expander, in which the strain is parallel to the electrode surfaces.

Figure 5:
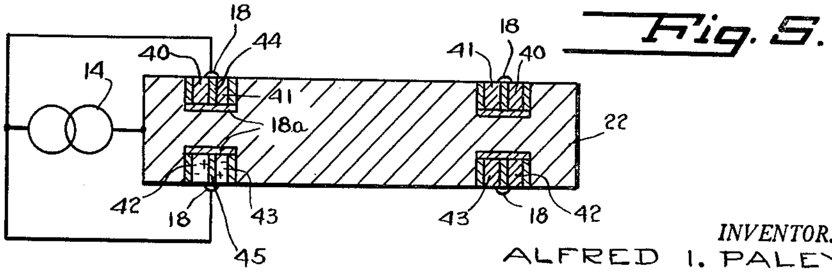
FIG. 5 is a further modification of FIG. 3.

FIG. 5 is a further adaptation of FIG. 3 in which the active material is adapted to thickness expansion. In the case of a disc vibrator, the active material is made in the form of concentric rings 40, 41 and 42, 43 having similarly polarized faces in contact. The rings are excited for thickness vibration which amounts to radial vibration in the disc transducer resulting in a flexure mode vibrating transducer. In this construction the intermediate electrodes 44, 45 are at a high potential, interrupting the unipotential surface inside and outside of the electrodes 44, 45. However, the edge of electrodes will be at the nodal circles and the small area and can be insulated without any serious difficulty. Also since the insulation 18 is at the nodal circle it will not damp the oscillation. The high potential electrodes 44, 45 must be insulated from the body 22 at the bottom of the recesses as well and this is accomplished by insulating washers 18*a*, for example.

Figure 6:
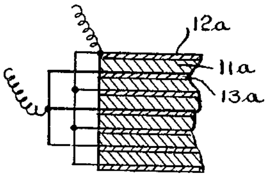
FIG. 6 is a further modification of FIGS. 2–5.

Although FIGS. 2–5 have shown the sandwich fabricated in two layers, any even number of layers can be used as shown in FIG. 6, with continuing reduction in impedance while maintaining the same mechanical properties. This construction requires external electrical connections between alternate layers since the adjacent interfaces of the electrostrictive material must be connected to a potential source of opposite polarity.

I claim:

1. In a device of the character described, a piezoelectric transducer including two outer electrodes and a central electrode, first piezoelectric material between one of said outer electrodes and said central electrode, second piezoelectric material between the other of said outer electrodes and said central electrode, said first and second piezoelectric materials being oriented so that like polarity surfaces are in contact with said central electrode, means for electrically connecting said outer electrodes together and means for applying an electrical field between said outer and central electrodes, and a metallic platelike member, said transducer being located in a recess in the surface of said member with at least one of said outer electrodes in contact with said member, said platelike member being a disc having an annular recess and said electrodes being annular plates.

2. In a device of the character described, a piezoelectric transducer including two outer electrodes and a central electrode, first piezoelectric material between one of said outer electrodes and said central electrode, second piezoelectric material between the other of said outer electrodes and said central electrode, said first and second piezoelectric materials being oriented so that like polarity surfaces are in contact with said central electrode, means for electrically connecting said outer electrodes together and means for applying an electrical field between said outer and central electrodes, and a metallic platelike member, said transducer being located in a recess in the surface of said member with at least one of said outer electrodes in contact with said member, said platelike member being a disc having an annular recess and said electrodes being concentric rings.

3. Electromechanical transducer apparatus, comprising:

a transducer assembly including a first body of piezoelectric material, a first electrode on one surface of said body, a second electrode on a surface of said body opposite said one surface, a second body of piezoelectric material on said second electrode opposite said first body, said first and second bodies being oriented so that like polarity surfaces thereof are in contact with said second electrode, and a third electrode on said second body opposite said second electrode;

means for electrically connecting together said first and third electrodes;

means for applying voltages between said second electrode and both of said first and third electrodes; and an electrically-conductive, flexible, plate-like member having a recess therein, said assembly being mounted in said recess with at least said third electrode in electrical contact with said member and said second electrode insulated from said member, said assembly being physically connected to the walls of said recess to exert stresses thereon and to flex said member in response to voltages applied between said second electrode and said first and third electrodes, said first and third electrodes being disposed respectively in contact with opposite walls of said recess.

References Cited by the Examiner

UNITED STATES PATENTS

| | | | |
|---|---|---|---|
| 1,907,425 | 5/33 | Marrison | 310—9.6 X |
| 2,607,858 | 8/52 | Mason | 310—9.6 X |
| 2,683,856 | 7/54 | Kornei | 310—8.2 X |
| 2,860,265 | 11/58 | Mason | 310—8.7 X |
| 2,864,013 | 12/58 | Wood | 310—8.6 X |
| 2,900,536 | 8/59 | Palo | 310—9.6 |
| 3,004,176 | 10/61 | Mason et al. | 310—8.6 X |
| 3,030,527 | 4/62 | Czyryk et al. | 310—8.6 X |
| 3,123,727 | 3/64 | Kritz | 310—8.2 |

ORIS L. RADER, *Primary Examiner.*

JOHN F. COUCH, *Examiner.*